(No Model.)
W. H. GODDARD.
POTATO PLANTER.
No. 584,156. Patented June 8, 1897.
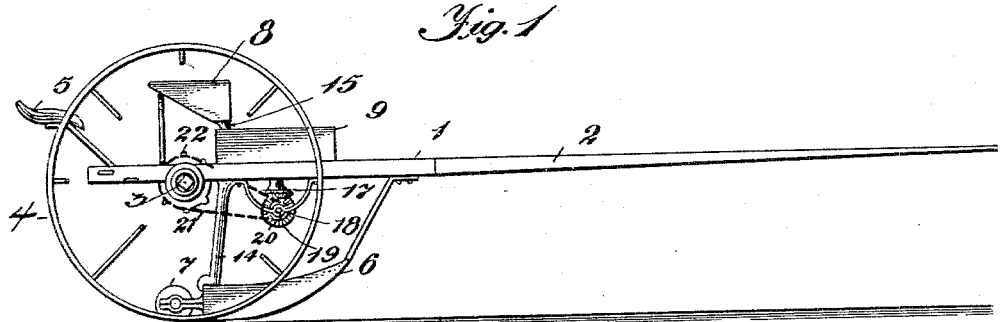
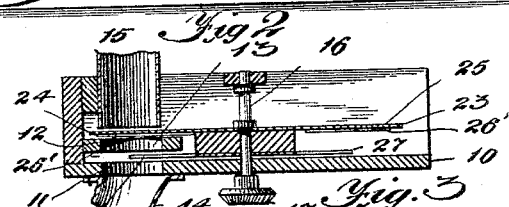
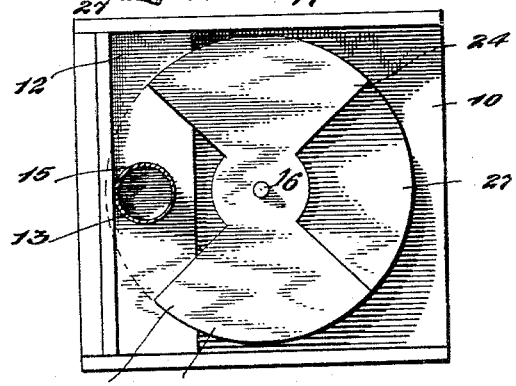
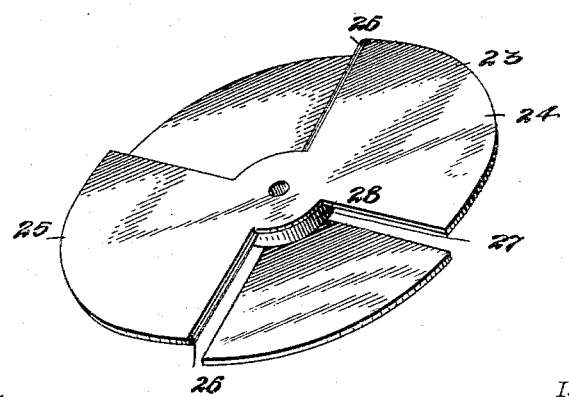
WITNESSES
INVENTOR
William H. Goddarad
by John Wedderburn
Attorney

UNITED STATES PATENT OFFICE.

WILLIAM H. GODDARD, OF PUTNEY, SOUTH DAKOTA.

POTATO-PLANTER.

SPECIFICATION forming part of Letters Patent No. 584,156, dated June 8, 1897.

Application filed November 3, 1896. Serial No. 610,918. (No model.)

*To all whom it may concern:*

Be it known that I, WILLIAM H. GODDARD, a citizen of the United States, residing at Putney, in the county of Brown and State of South Dakota, have invented certain new and useful Improvements in Potato-Planters; and I do hereby declare the following to be a full, clear, and exact description of the invention, such as will enable others skilled in the art to which it appertains to make and use the same.

My invention relates to potato-planters.

My object is to provide a potato-planter having a novel form of cutting or slicing mechanism whereby the potatoes are cut into regular slices and it is impossible for the potatoes to pass the severing or cutting mechanism without being properly acted upon, and, further, to provide a potato-planter which will operate smoothly and easily and be adapted to cut and plant a large quantity of potatoes.

Having this object in view the invention consists of a potato-planter comprising, among other features, a novel form of severing-knife and an improved guard, all of which will appear more fully hereinafter.

In the accompanying drawings, Figure 1 is a side elevation of my improved potato-planter; Fig. 2, a sectional view of the cutting or severing mechanism; Fig. 3, a top view thereof, and Fig. 4 a perspective detail view of the cutting-knife and the guard.

The numeral 1 designates the frame of the machine, which is provided with the usual draft-tongue 2 and has a main shaft or axle 3, which is connected to the traction-wheels 4, while 5 designates the driver's seat.

At 6 there is shown a shoe adapted to open the furrow, and immediately behind this shoe there is located a covering-wheel 7.

At 8 is shown the potato-hopper into which the potatoes are placed prior to their being cut. Below said hopper there is located a box-like structure 9, in which the cutting or severing mechanism operates. Said box is provided with a bottom 10, through which is made an opening 11. Immediately above the bottom of the box there is a plate 12, which is provided with an aperture 13, in alinement with the aperture 11, these two apertures being of the proper size to accommodate the potatoes.

At 14 there is shown a pipe or tube which leads down from the opening 11 to a point immediately in the rear of the shoe, and this constitutes the delivery-tube which allows the cut pieces of potato to be fed into the drill made by the shoe. There is another pipe 15 connected to the box, and this is provided with an upper flaring portion adapted to receive the potatoes as they feed down from the hopper. This pipe lies immediately above the opening 13 in the plate 12.

The numeral 16 designates a shaft which extends up through the box, and on the lower end of this shaft there is located a bevel-gear 17. There is an auxiliary shaft 18, which carries a bevel-gear 19, which meshes with the gear 17. Said shaft also carries a sprocket 20, and a sprocket-chain 21 connects this sprocket with a drive-sprocket 22 on the shaft to which the traction-wheels are connected. There is a knife 23, which is secured to the shaft 16 and adapted to operate over the plate 12 and under the lower end of the feed-pipe. Said knife 23 is made up of two sector-shaped pieces 24 and 25, which constitute quadrants of a circle. These portions of the knife are beveled, as at 26, to provide a sharp cutting edge. A thin diametrically-extending strip 26' is connected to the bottom of the knife and serves to prevent the slices of potato from adhering.

The numeral 27 designates a guard which is of identically the same construction as the knife, with the exception that it is not provided with cutting edges, and said guard is carried by the shaft 16 and adapted to operate between the plate 12 and the bottom of the box. Its portions are so disposed that they coincide with the spaces between the quadrants of the cutting-knife. The knife and the guard are kept separated by washers or disks 28.

The operation is as follows: Assuming that one of the quadrants of the guard covers the opening 11 in the bottom of the box. A potato is fed down through the feed-tube, but is prevented from descending through the delivery-tube, as its progress is arrested by the guard. As the machine advances the shaft is set in rotation and one portion of the cutting-knife passes around and in between the feeding-tube and the plate 12, cutting off a slice of potato, which now drops down through the delivery-tube, because as soon as the knife has made its complete cut the guard has uncovered the opening. It will be observed that the knife now covers the opening 13, so that the remainder of the potato rests upon this portion of the knife. As the shaft further rotates the second portion of the guard is brought around to cover the opening 11, and that portion of the cutting-knife which has just completed a cut is removed from the opening 13, so that the potato again feeds downward onto the guard and the remaining portion of the knife comes around and cuts another slice. This operation is continued during the movements of the machine. The covering-wheel follows in the wake of the shoe and packs the soil down upon the cut slices of potato, which are placed at regular distances apart.

It is obvious that my improved device could be connected to an ordinary farm-wagon if necessary and it would operate in as satisfactory a manner as that described.

There are many slight changes of construction that could be resorted to in carrying out the invention without detracting from any of its advantages, and hence I am to be understood as claiming all such variations of construction as come properly within the spirit and scope of the invention.

Having thus described my invention, what I claim as new, and desire to secure by Letters Patent, is—

1. In a potato-planter, the combination with a bottom having an opening, of a rotary shaft, a knife carried by said shaft and having separated blades, said knife operating on one side of the bottom, and a guard secured to the shaft on the other side of the bottom and which is located between the separate portions of the knife.

2. In a potato-planter, the combination with a bottom having an opening, of a rotary shaft, a knife carried by said shaft and operating over the bottom, which knife consists of sector-shaped members, and a guard secured to the shaft and operating below the bottom, which guard also comprises sector-shaped separated portions and which are located intermediate the sector-shaped portions of the knife.

3. In a potato-planter, the combination with a box having a bottom provided with an opening, and an upper plate extending across the box and also provided with an opening in register with the first-named opening, a feed-tube located above the opening in the plate and down which the potatoes pass, a rotary shaft, a knife secured to said shaft and comprising oppositely-extending quadrant-shaped portions which operate between the lower end of the tube and the plate, and a lower guard carried by the shaft and also comprising oppositely-extending quadrant-shaped portions which operate between the plate and the bottom of the box and extend at right angles to the portions of the cutting-knife so that they lie between the portions of the said knife.

4. In a potato-planter, the combination with a bottom having an opening to receive the potato, of a rotary shaft, a knife carried thereby and operating above the said bottom, and a strip connected to said knife underneath the same and above the aforesaid bottom and adapted to prevent the sliced potatoes from adhering.

In testimony whereof I have signed this specification in the presence of two subscribing witnesses.

WILLIAM H. GODDARD.

Witnesses:
K. McKenzie,
W. I. Erwin.